(12) United States Patent
Bonita

(10) Patent No.: US 8,561,316 B2
(45) Date of Patent: Oct. 22, 2013

(54) GRANULATION DEVICE

(75) Inventor: Antonio Bonita, Lucca (IT)

(73) Assignee: Zanchetta S.r.l., Montecarlo (IT)

( * ) Notice: Subject to any disclaimer, the term of this patent is extended or adjusted under 35 U.S.C. 154(b) by 1190 days.

(21) Appl. No.: 12/447,496

(22) PCT Filed: Nov. 13, 2007

(86) PCT No.: PCT/IB2007/003462

§ 371 (c)(1),
(2), (4) Date: Apr. 28, 2009

(87) PCT Pub. No.: WO2008/059343

PCT Pub. Date: May 22, 2008

(65) Prior Publication Data

US 2010/0058612 A1    Mar. 11, 2010

(30) Foreign Application Priority Data

Nov. 15, 2006   (IT) ............... BO2006A0779

(51) Int. Cl.
*F26B 17/12* (2006.01)

(52) U.S. Cl.
USPC ............ 34/165; 34/168; 34/179; 34/215; 34/82; 34/586

(58) Field of Classification Search
USPC ........ 34/165, 167, 168, 177, 209, 210, 215, 34/218, 82, 586, 179
See application file for complete search history.

(56) References Cited

U.S. PATENT DOCUMENTS

| | | | | |
|---|---|---|---|---|
| 1,384,047 A | * | 7/1921 | Carter | 34/505 |
| 2,636,575 A | * | 4/1953 | Watson | 95/111 |
| 2,686,161 A | * | 8/1954 | Stewart | 502/9 |
| 3,357,748 A | * | 12/1967 | Lenhart | 406/129 |
| 3,445,247 A | * | 5/1969 | Baerwald | 426/640 |
| 3,549,336 A | * | 12/1970 | Hodel | 23/313 R |
| 4,352,718 A | | 10/1982 | Guriyuun | |
| 4,490,403 A | * | 12/1984 | Pisecky et al. | 426/453 |
| 5,607,353 A | * | 3/1997 | Hutchings et al. | 454/187 |
| 2001/0043848 A1 | * | 11/2001 | Boos | 414/21 |

FOREIGN PATENT DOCUMENTS

| | | | |
|---|---|---|---|
| EP | 1157736 A | | 11/2001 |
| JP | 56126402 A | | 10/1981 |
| JP | 2002036238 A | * | 2/2002 |
| SU | 1170242 A | * | 7/1985 |
| WO | 9106365 A | | 5/1991 |

\* cited by examiner

*Primary Examiner* — Jiping Lu

(74) *Attorney, Agent, or Firm* — Pearne & Gordon LLP

(57) ABSTRACT

A granulation device comprises a wet granulation unit (2), comprising a chamber (4), for mixing a powder product with appropriate binding agents, and a dry granulation unit (3), comprising a chamber (26), for mixing a product exiting from the wet granulation unit (2); the dry granulation unit (3) being operatively connected with the wet granulation unit (2).

19 Claims, 6 Drawing Sheets

GRANULATION DEVICE

TECHNICAL FIELD

This invention refers to a granulation device.

This invention can be advantageously applied in the chemical and/or pharmaceutical and/or food processing industries and in all cases in which it is necessary to granulate a loose powder material such as, for example, a drug or a medicine.

BACKGROUND ART

The process for granulating a powder material normally consists of a series of distinct steps. In particular, this production process includes a first wet granulation step which allows the product to form rough and irregular agglomerates.

These agglomerates then usually undergo a milling process to reduce and homogenize the dimensions of the agglomerates.

The process concludes with a dry granulation step which also helps to dry the finished product.

A granulation device which carries out this process typically consists of separate units, each performing a specific step of the production process.

Each step in the process is carried out by processing measured doses of material, one after another. More specifically, a dose of material is fed into a first wet granulation unit, where it is processed. At the end of this step, the product is discharged from the first unit and fed into a second unit for the milling step.

On conclusion of the milling step, the second unit is unloaded and the product is fed into a third unit for the dry granulation step, completing the production process.

It should be noted that, depending on the type of material, the granulation process can be carried out excluding at least one of the above-mentioned steps.

For example, some products do not need to be milled while in other cases only the wet granulation and milling steps are necessary.

Known granulation device do, however, present some drawbacks.

First of all, the known devices carry out powder product granulation in a discontinuous manner. In fact, each dose of powder is processed independently from the subsequent dose, with a certain time interval between one production cycle and the next.

It is, however, sometimes necessary to have a more constant production of granulated product, avoiding the typical interruptions of the known devices.

DISCLOSURE OF THE INVENTION

The aim of this invention is to provide a granulation device that does not have the above-mentioned disadvantages.

In particular, the aim of this invention is to provide a granulation device that allows granulated material to be produced as constantly and continuously as possible.

Another aim of this invention is to provide a granulation device that is compact and with reduced overall dimensions.

Additional features and advantages will become clearer from the detailed description of a preferred but not exclusive embodiment of a granulation device according to this invention.

BRIEF DESCRIPTION OF THE DRAWINGS

This description will be provided below with reference to the accompanying drawings, provided as a non-binding example, in which.

DESCRIPTION OF THE PREFERRED EMBODIMENTS OF THE INVENTION

Figure 1:
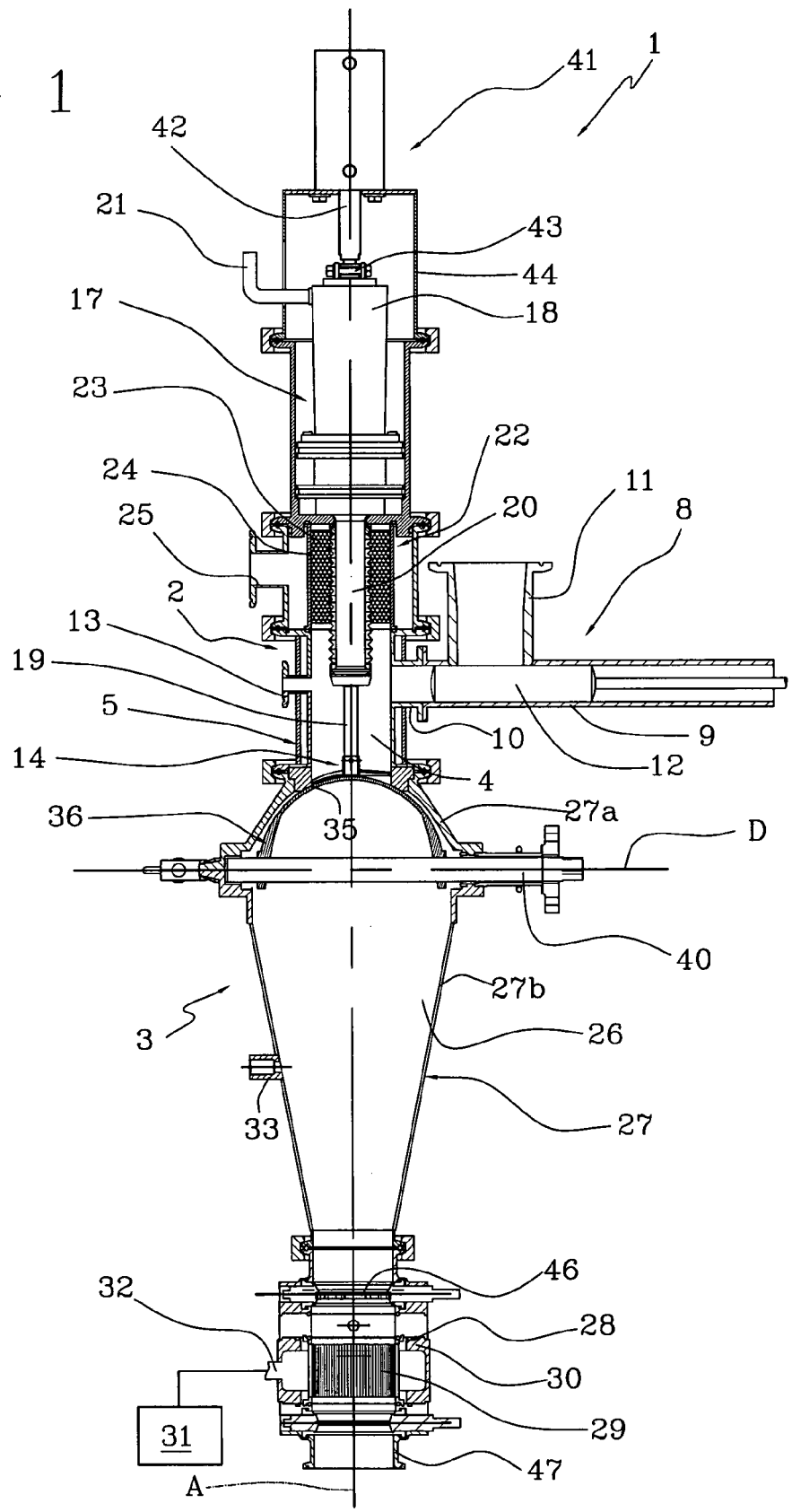
FIG. 1 shows a side cross-section view of a granulation device according to the invention.

The device 1 comprises a wet granulation unit 2 and a dry granulation unit 3. The wet granulation unit 2 and the dry granulation unit 3 are operatively connected to each other.

The wet granulation unit 2 comprises a chamber 4, which develops along a longitudinal axis "A" of the device 1, inside which a powder product is mixed with additives necessary for the granulation process. These additives are usually binding agents which allow small particles to bind together to form larger aggregates.

The chamber 4 of the wet granulation unit 2 can be heated and is defined by a side wall 5 formed by two coaxial cylindrical bodies 6a, 6b. Between these two bodies is a hollow space 7 which can be filled with a heatable liquid to obtain the temperature suitable for processing the product.

The wet granulation device 2 also comprises an infeed device 8 to feed the product into the chamber 4 of the wet granulation device 2. The infeed device 8 comprises an infeed tube 9 positioned horizontally and connected to an entry conduit 10 in the side wall 5 of the wet granulation unit 2. A hopper 11 is fixed to the infeed tube 9 and is in communication with the tube 9. Inside the tube is a cylindrical piston 12 which allows adjustment of the quantity of product fed into the chamber 4.

More specifically, in the rear position the piston 12 allows a portion of product contained in the hopper 11 to fall by gravity into the tube 9 and to be pushed into the chamber 4 of the wet granulation unit 2 by the piston 12 moving forward. Advantageously, it is possible to adjust the amount of product fed into the chamber 4 by adjusting the stroke of the piston 12.

The wet granulation unit 2 also comprises an entry nozzle 13 to allow the above-mentioned binding agents to be fed into the chamber 4. This nozzle 13 develops along a longitudinal axis "B" substantially perpendicular to the longitudinal axis "A" of the device 1.

The wet granulation unit 2 also comprises a rotating propeller 14 positioned inside the chamber 4 of the wet granulation unit 2. The propeller 14 comprises a central hub 15 and two blades 16, each tapered, twisted and curving downwards.

Advantageously, the propeller 14 turns in a first rotation direction and allows the movement of the portion of product fed into the chamber 4 to permit uniform mixing of this product with the above-mentioned binding agents. This carries out the wet granulation step.

The propeller 14 is driven by appropriate means of movement 17 which allow the propeller 14 to turn in a first rotation direction and in a second direction opposite to the first one.

Figure 2:
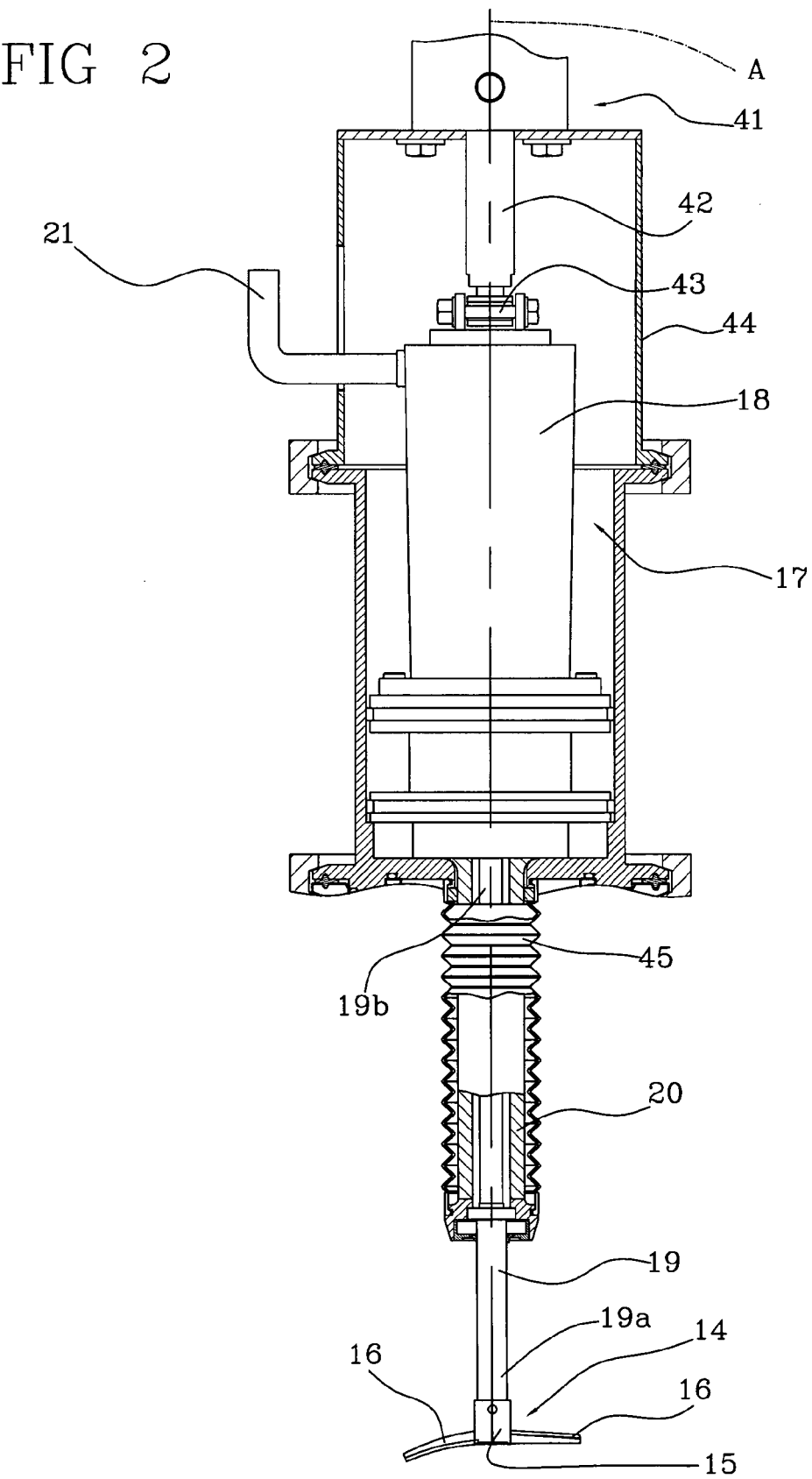
FIG. 2 shows a side cross-section view of a first detail of the device in FIG. 1.
Figure 3:
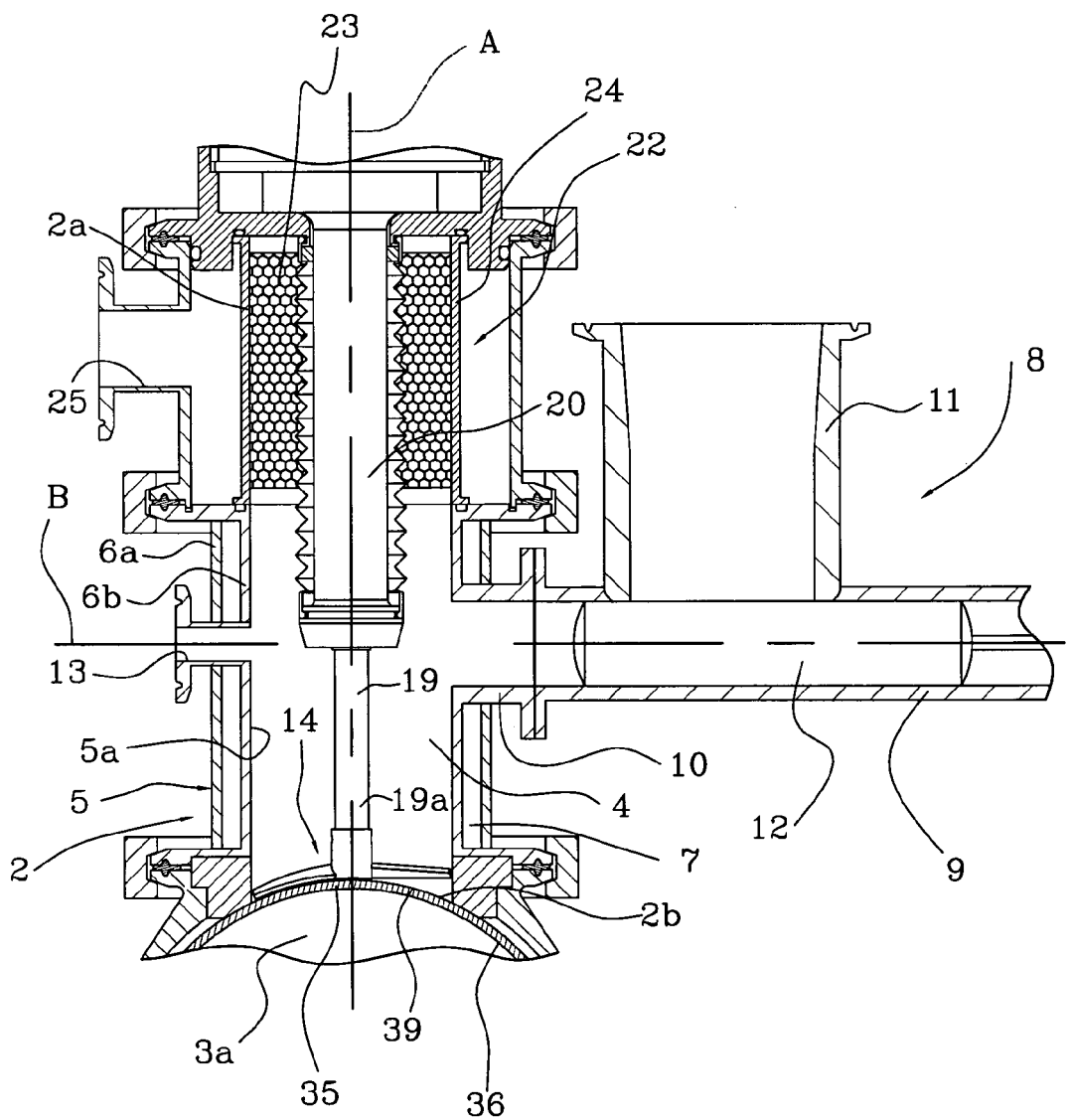
FIG. 3 shows a side cross-section view of a second detail of the device in FIG. 1.
Figure 4:
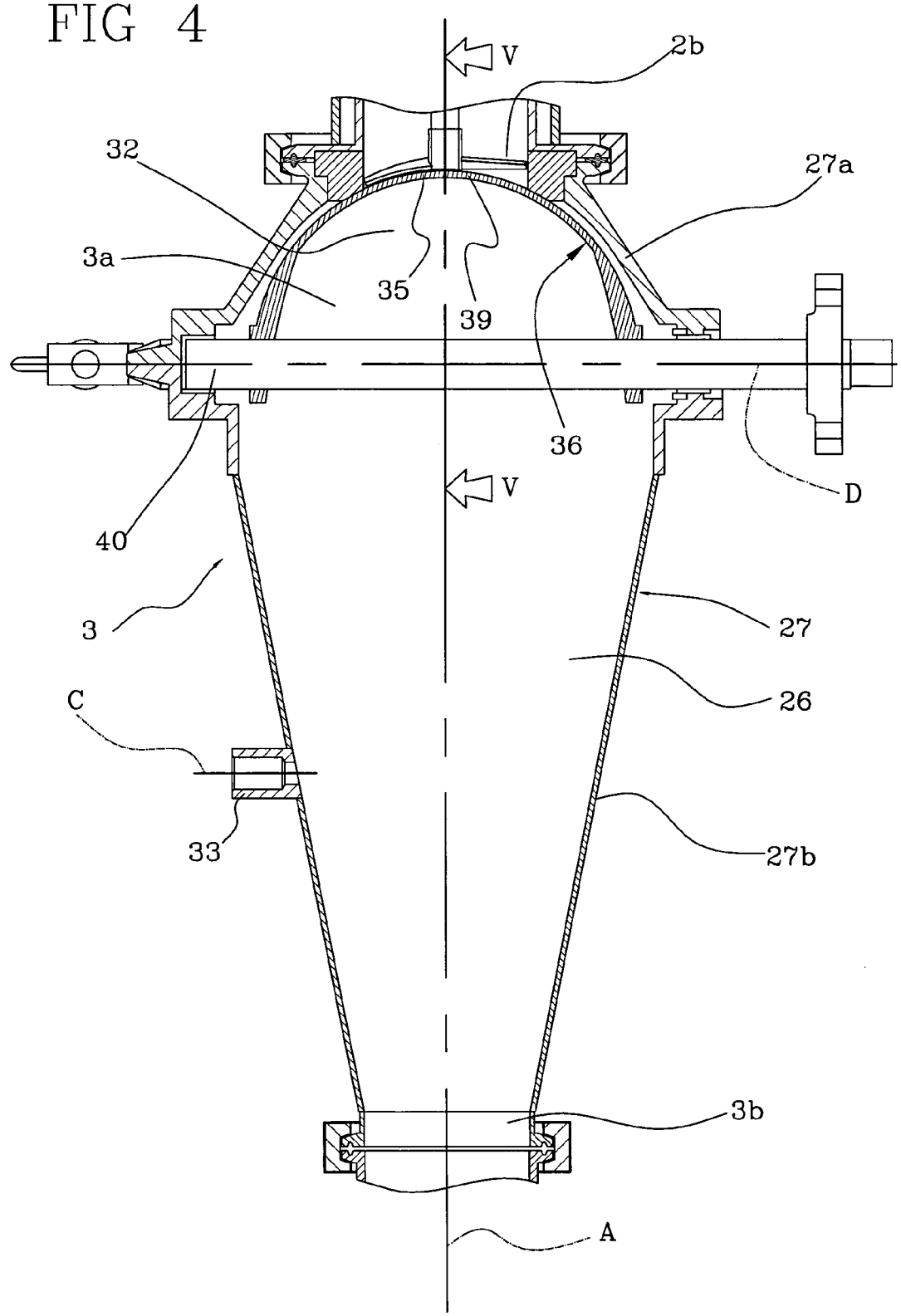
FIG. 4 shows a side cross-section view of a third detail of the device in FIG. 1.

The means of movement 17 comprise an electric motor 18 which rotates a drive shaft 19 connected at one end 19a to the propeller 14. A second end 19b of the shaft 19 is connected to the motor 18. The drive shaft 19 runs at least partially inside a sleeve 20 fixed to the motor 18 (FIG. 2). The motor 18 is powered through appropriate electrical connectors 21.

The device 1 also comprises a first filtering unit 22 through which the air exiting from the device 1 passes. In particular, the first filtering unit 22 is positioned at one end 2a of the wet granulation unit 2. This first filtering unit 22 is operative to at least dispose of the flow of humidified air which enters through the nozzle 13 when the wet granulation unit 2 is operative. The first filtering unit 22 comprises a filter 23 positioned above the wet granulation unit 2 and is housed in a tubular support body 24 coaxial to the wet granulation unit 2 and to the longitudinal axis "A" of the device 1. The filtered air is thus expelled from the device 1 through an outlet 25 in the tubular body 24.

The dry granulation unit 3 comprises a respective chamber 26 inside which a second dry granulation step takes place by means of mixing with at least one flow of dried air.

Advantageously, the wet granulation unit 2 is directly connected to the dry granulation unit 3 along the longitudinal axis "A" of the device 1.

More specifically, the wet granulation unit 2 presents a second end 2b opposite the first end 2a and positioned lower down. This second end 2b is directly connected to a first end 3a of the dry granulation unit 3.

In other words, the wet granulation unit 2 is positioned above the dry granulation unit 3. In the embodiment described here, the wet granulation unit 2 is coaxial to the dry granulation unit 3.

The dry granulation unit 3 comprises a side wall 27 with a first truncated cone portion 27a tapered towards the top and connected to a second truncated cone portion 27b tapered towards the bottom. Overall, the side wall 27 of the dry granulation unit 3 defines the chamber 26 and develops along the abovementioned longitudinal axis "A" of the device 1.

During the functioning of the dry granulation unit 3, a flow of dried air enters the chamber 26. In particular, this flow enters close to a second end 3b of the dry granulation unit 3.

In detail, the device 1 comprises a second filtering unit 28 through which the incoming flow of dried air is purified. This unit 28 is positioned close to the second end 3b of the dry granulation unit 3 and comprises an additional filter 29 housed in a relative substantially cylindrical support structure 30.

The flow of dried air, produced by appropriate generating means 31 (represented schematically in FIG. 1), enters the support structure 30 through an access conduit 32 and flows into the chamber 26 of the dry granulation unit 3 from the bottom upwards.

The product partially granulated in the chamber 4 of the wet granulation unit 2 is transferred to the chamber 26 of the dry granulation unit 3 and kept tossed around by the flow of dried air entering from the above-mentioned second end 3b of the dry granulation unit 3.

During this step, further additives are fed into the chamber 26 of the dry granulation unit 3 through another entry nozzle 33 located on the side wall 27 of the chamber 26. In detail, this additional nozzle 33 is cut through the second truncated cone portion 27b and presents an axis "C" which develops substantially perpendicular to the longitudinal axis "A" of the device 1.

During this step, the flow of dried air exits from the device 1 through the chamber 4 of the wet granulation unit 2 and the first filtering unit 22, being expelled through the above-mentioned outlet 25.

The device 1 also comprises milling means 34, which may operate between the chamber of the wet granulation unit 2 and the chamber 26 of the dry granulation unit 3 when the first wet granulation step is finished. In fact, following this step, the powder product is bound together in irregular agglomerates which may be larger than required. If necessary, the milling means 34 uniformly reduce the size of the agglomerates, transferring the product from the chamber 4 of the wet granulation unit 2 to the chamber 26 of the dry granulation unit 3.

The device 1 also comprises a mobile baffle 35 which can be located between the chamber of the wet granulation unit 2 and the chamber 26 of the dry granulation unit 3. The baffle 35 separates the two chambers 4, 26.

More specifically, the device 1 comprises a spherical cap 36 which can turn around its own rotation axis "D". The cap 36 presents a first portion 36a which defines the baffle 35. The cap 36 also comprises a second portion 36b which at least in part defines the above-mentioned milling means 34.

Figure 5A:
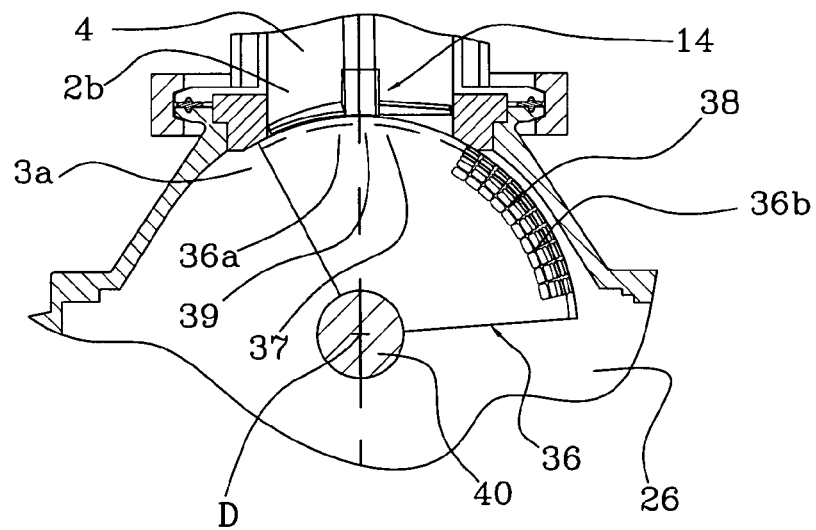
FIGS. 5a, 5b and 5c show a side cross-section view of the detail in FIG. 4 along the line V-V in three separate positions.
Figure 5B:
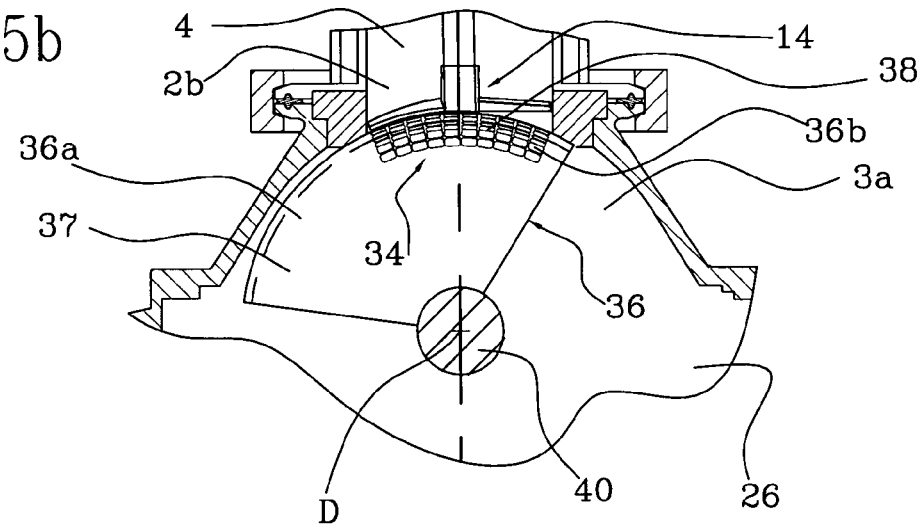

More specifically, the first portion 36a of the cap 36 comprises a continual surface 37 that can face the chamber 4 of the wet granulation unit 2 in a first position (FIG. 5a). In a similar way, the second portion 36b of the cap 36 comprises a perforated surface 38 that can face the chamber 4 of the wet granulation unit 2 in a second position (FIG. 5b).

The cap 36 is housed inside the chamber 26 of the dry granulation unit 3, in the second truncated cone portion 27b of the side wall 27 of the dry granulation unit 3.

The cap 36 operates at the first end 3a of the dry granulation unit 3 and, in a similar way, at the second end 2b of the wet granulation unit 2.

When the cap 36 is in the first position, the chamber 4 of the wet granulation unit 2 is isolated from the chamber 26 of the dry granulation unit 3 and the wet granulation unit 2 is operative. In this case, the first portion 36a of the cap 36 defines a bottom wall 39 of the chamber 4 of the wet granulation unit 2.

The perforated surface 38 comprises a plurality of through holes which are parallel to each other and positioned uniformly on the second portion 36b.

In this position, the milling means 34 are operative. In particular, the milling means 34 comprise a second portion 36b of the cap 36, with a perforated surface 38, and the propeller 14. In detail, when the milling means 34 are operative, the propeller 14 works in combination with the second portion 36b of the cap 36 and rotates in the opposite direction to the first one. In this way, the granulated product present in the chamber 4 of the wet granulation unit 2, at the end of the first granulation step, is forced by the blades 16 of the propeller 14 to pass through the holes in the second portion 38. The product thus passes into the chamber 26 of the dry granulation unit 3 to undergo the dry granulation step.

Figure 5C:
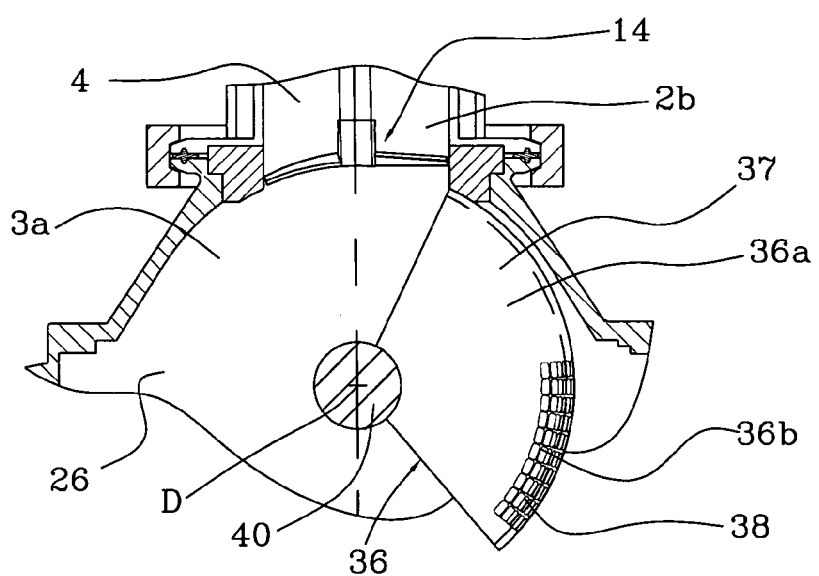
Figure 6:
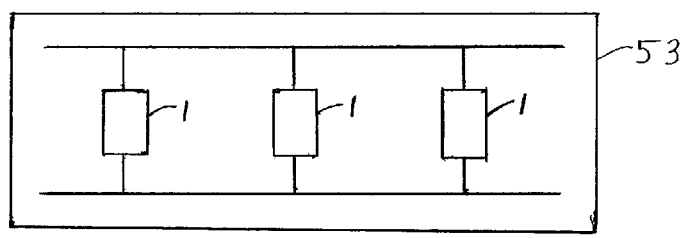
FIG. 6 is a schematic view of a plant 53 for granulation of loose powder product comprising a plurality of granulation devices 1 connected together in parallel. With reference to the accompanying drawings, the number 1 is used to indicate overall a granulation device according to this invention.

The cap 36 can also take up a third non-operative position in which it is not positioned between the chamber 4 of the wet granulation unit 2 and the chamber 26 of the dry granulation unit 3 (FIG. 5c). In this way, the chambers 4, 26 are in complete fluid communication with each other.

This last position is employed when the dry granulation unit 3 is operative. In fact, as already mentioned, during the dry granulation step the flow of dried air, entering through the second end 3b of the dry granulation unit 3, is expelled from the device 1 passing through the chamber 4 of the wet granulation unit 2. It is therefore necessary for the cap 36 to move so as to leave the passage between the chambers 4, 26 completely free.

The cap 36 is also fixed to a support shaft 40. The support shaft 40 is coaxial to the rotation axis "D" of the cap 36 and imparts the rotation movement on the cap 36. The movement of the shaft 40 and the cap 36 is provided by appropriate drive means not shown in the figures. The rotation axis "D" is substantially perpendicular to the longitudinal axis "A" of the device 1.

The device 1 also comprises lifting means 41 which operate on the means of movement 17 to adjust the height of the latter. In detail, the lifting means 41 comprise a pneumatic cylinder 42 which is connected by means of a pin 43 to the motor 18. In this way, when the lifting means 41 are activated, the height of the motor 18 and, consequently, of the propeller 14 is altered. More specifically, the means of movement 17 are contained in a casing 44 and the cylinder 42 is integral with this casing 44. In addition, the lifting means 41 comprise bellows 45 fixed to one end of the sleeve 20 and to the casing 44.

In operation, during the wet granulation step a portion of product may adhere to the inner surface 5a of the wall 5 of the chamber 4 of the wet granulation unit 2.

To remove this portion of product, the propeller 14 is rotated and the lifting means 41 are activated. In this way, the blades 16 of the propeller 14 sweep the entire inner surface 5a and remove the portion of product adhering to this inner surface 5a.

At the end of the entire production cycle, the flow of dried air stops and the granulated product drops down, passing through a sieve 46 located inside the structure support 30 of the second filtering unit 28. The product is discharged from the device 1 through an outlet 47.

Finally, a plurality of devices 1 as described above can be mounted in a plant 53 for the granulation of loose powder product.

This plant 53 comprises a rotating tower on which the devices 1 are mounted. These devices 1 are connected to each other in parallel. In other words, the plant comprises a single infeed conduit that is fed with product from a magazine positioned upstream and is connected to each infeed device 8 of each granulation device 1.

The invention fulfills the proposed aims and provides important advantages.

First of all, the direct connection between the wet granulation unit 2 and the dry granulation unit 3 makes the device 1 more compact. This makes it possible to carry out each production cycle more quickly.

In fact, the time needed to transfer the product from one granulation unit to the other is reduced or eliminated, since this transfer takes place at the same time as the product milling step.

In addition, due to the compactness of the device 1, it is possible to process smaller amounts of powder product, but more quickly. The time needed for each production cycle is therefore reduced and the cycle frequency is increased.

Overall, therefore, the entire production process is more uniform and the quantity of granulated product discharged from the device is more constant.

A further advantage that can be mentioned refers to the performance of the device 1 which is better than that of known devices. In fact, since the device 1 can process smaller amounts of product, but at a higher speed, each production cycle is more efficient from an energy point of view. Overall, therefore, the ratio between the amount of product processed during operation and the energy consumed is higher.

The invention claimed is:

1. A granulation device comprising:
a wet granulation unit (2), comprising a first chamber (4), for mixing a powder product with at least humidified air, the wet granulation unit (2) being effective to agglomerate the powder product and to yield agglomerates of the powder product;
a dry granulation unit (3), comprising a second chamber (26), for mixing an agglomerated product exiting from the wet granulation unit (2) with at least dried air; the dry granulation unit (3) being operatively connected with the wet granulation unit (2) and being effective to dry said agglomerated product, characterized in that the wet granulation unit (2) is directly connected with the dry granulation unit (3) along a longitudinally developing axis (A) of the device, the granulation device further comprising a mobile baffle (35) located between the first chamber (4) and the second chamber (26) to separate the chambers (4, 26) from each other, the baffle being positionable (a) in a first position wherein fluid communication between the first chamber (4) and the second chamber (26), including transfer of agglomerated product from the first chamber (4) to the second chamber (26), is blocked and (b) in a second position wherein the first chamber (4) is in fluid communication with the second chamber (26), characterized in that the device comprises a spherical cap (36) which can turn around its own rotation axis (D) and having a first portion (36a) forming the baffle (35), and characterized in that the device comprises milling means (34) operative between the chamber (4) of the wet granulation unit (2) and the chamber (26) of the dry granulation unit (3) to grind the product exiting from the chamber (4) of the wet granulation unit (2) and transfer the product to the chamber (26) of the dry granulation unit (3), and further characterized in that the cap (36) comprises a second portion (36b) adjacent to the first portion (36a), the second portion (36b) defining at least in part the milling means (34).

2. A device according to claim 1, characterized in that the wet granulation unit (2) is positioned above the dry granulation unit (3).

3. A device according to claim 1, characterized in that the wet granulation unit (2) is coaxially connected to the dry granulation unit (3).

4. A device according to claim 1, characterized in that the first portion (36a) comprises a continuous surface (37) designed to face the chamber (4) of the wet granulation unit (2) in a first position of the cap (36) and in that the second portion (36b) comprises a perforated surface (38) designed to face the chamber (4) of the wet granulation unit (2) in a second position of the cap (36).

5. A device according to claim 4, characterized in that in its first position the cap (36) defines a bottom wall (39) of the chamber (4) of the wet granulation unit (2).

6. A device according to claim 1, characterized in that the cap (36) can move to a third position in which the cap (36) is not between the chamber (4) of the wet granulation unit (2) and the chamber (26) of the dry granulation unit (3), placing the chambers (4, 26) in fluid communication with each other.

7. A device according to claim 6, characterized in that the cap (36) is fixed to a support shaft (40) which can rotate around the axis (D) to move the cap (36) between the different positions.

8. A device according to claim 1, characterized in that the milling means (34) comprise a propeller (14) to push the product into the chamber (26) of the dry granulation unit (3).

9. A device according to claim 1, characterized in that the rotation axis (D) of the cap (36) is perpendicular to the longitudinal axis (A) of the device.

10. A device according to claim 1, characterized in that the device comprises means for heating the chamber (4) of the wet granulation unit (2).

11. A device according to claim 10, characterized in that the wet granulation unit (2) comprises a side wall (5) which at least in part defines the first chamber (4), the side wall (5) comprising two coaxial cylindrical bodies (6a, 6b) defining an inner hollow space (7) effective to be filled with a heating liquid.

12. A device according to claim 1, characterized in that the device comprises a first filtering unit (22) effective to purify a flow of air exiting from the device.

13. A device according to claim 12, characterized in that the device comprises a second filtering unit (28) effective to purify a flow of air entering the device.

14. A plant for granulation of loose powder product, characterized in that the plant comprises a granulation device according to claim 1.

15. A plant for granulation of loose powder product, characterized in that the plant comprises a plurality of granulation devices according to claim 1, these devices being connected together in parallel.

16. A device according to claim 1, wherein, when the baffle (35) is positioned in the second position, the agglomerated product can drop directly in a straight line from the first chamber (4) into the second chamber (26).

17. A granulation device comprising:
a wet granulation unit (2), comprising a first chamber (4), for mixing a powder product with at least humidified air, the wet granulation unit (2) being effective to agglomerate the powder product and to yield agglomerates of the powder product;
a dry granulation unit (3), comprising a second chamber (26), for mixing an agglomerated product exiting from the wet granulation unit (2) with at least dried air; the dry granulation unit (3) being operatively connected with the wet granulation unit (2) and being effective to dry said agglomerated product, characterized in that the wet granulation unit (2) is directly connected with the dry granulation unit (3) along a longitudinally developing axis (A) of the device, the granulation device further comprising a mobile baffle (35) located between the first chamber (4) and the second chamber (26) to separate the chambers (4, 26) from each other, the baffle being positionable (a) in a first position wherein fluid communication between the first chamber (4) and the second chamber (26), including transfer of agglomerated product from the first chamber (4) to the second chamber (26), is blocked and (b) in a second position wherein the first chamber (4) is in fluid communication with the second chamber (26), characterized in that the device comprises milling means (34) operative between the chamber (4) of the wet granulation unit (2) and the chamber (26) of the dry granulation unit (3) to grind the product exiting from the chamber (4) of the wet granulation unit (2) and transfer the product to the chamber (26) of the dry granulation unit (3), and characterized in that the milling means (34) comprise a propeller (14) to push the product into the chamber (26) of the dry granulation unit (3), and characterized in that the device comprises means (41) for lifting the propeller (14) to allow the latter to alter its height along the longitudinal axis (A).

18. A device according to claim 17, characterized in that the device comprises means of movement (17) effective to turn the propeller (14), and further characterized in that the lifting, means (41) comprise a pneumatic cylinder (42) which operates on the means of movement (17) to alter the height of the latter.

19. A granulation device comprising:
a wet granulation unit (2), comprising a first chamber (4), for mixing a powder product with at least humidified air, the wet granulation unit (2) being effective to agglomerate the powder product and to yield agglomerates of the powder product;
a dry granulation unit (3), comprising a second chamber (26), for mixing an agglomerated product exiting from the wet granulation unit (2) with at least dried air; the dry granulation unit (3) being operatively connected with the wet granulation unit (2) and being effective to dry said agglomerated product, characterized in that the wet granulation unit (2) is directly connected with the dry granulation unit (3) along a longitudinally developing axis (A) of the device, the granulation device further comprising a mobile baffle (35) located between the first chamber (4) and the second chamber (26) to separate the chambers (4, 26) from each other, the baffle being positionable (a) in a first position wherein fluid communication between the first chamber (4) and the second chamber (26), including transfer of agglomerated product from the first chamber (4) to the second chamber (26), is blocked and (b) in a second position wherein the first chamber (4) is in fluid communication with the second chamber (26), characterized in that the device comprises milling means (34) operative between the chamber (4) of the wet granulation unit (2) and the chamber (26) of the dry granulation unit (3) to grind the product exiting from the chamber (4) of the wet granulation unit (2) and transfer the product to the chamber (26) of the dry granulation unit (3), and characterized in that the milling means (34) comprise a propeller (14) to push the product into the chamber (26) of the dry granulation unit (3), and characterized in that the device comprises means of movement (17) effective to turn the propeller (14).

* * * * *